May 5, 1925.

R. B. HALEY ET AL

FOOD PRODUCT

Filed Jan. 2, 1924

1,536,791

INVENTORS
Ross B. Haley
Edgar G. Zinn
BY
Westall and Wallace
ATTORNEYS

Patented May 5, 1925.

1,536,791

UNITED STATES PATENT OFFICE.

ROSS B. HALEY AND EDGAR G. ZINN, OF LOS ANGELES, CALIFORNIA; SAID HALEY ASSIGNOR TO SAID ZINN.

FOOD PRODUCT.

Application filed January 2, 1924. Serial No. 683,868.

*To all whom it may concern:*

Be it known that we, Ross B. HALEY and EDGAR G. ZINN, citizens of the United States, and residents of Los Angeles, in the county of Los Angeles and State of California, have invented new and useful Improvements in Food Products, of which the following is a specification.

This invention relates to a candied food product. It pertains more especially to the rind of a fruit so treated as to toughen the latter and to replace the cell juices with syrup.

In the preparation of certain foods, among which are baked cakes, candied citron, orange and lemon peel are often used. The present invention relates to a product which may be similarly used. It pertains more especially to the treatment of the rinds of melons and fruit of the same family, and the product resulting therefrom. Such fruit have a rind which is of cellular formation and easily broken down. Heretofore, attempts to extract the natural juices from the cells of such fruits has resulted in rupture of their cell walls and a destruction of the body. The primary object of this invention is to provide a process for extracting the cell juices from fruit of this character without any substantial injury to the rind and to replace the juice so extracted with syrup.

These objects together with other objects and corresponding accomplishments are obtained by means of the embodiment of our invention described herein, and wherein the steps of a process are indicated diagrammatically consecutively in the figures of the accompanying drawing.

Figure 1:
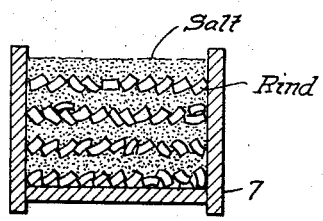
Figure 2:
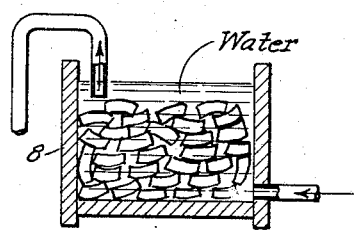
Figure 3:
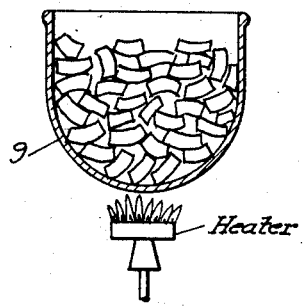
Figure 4:
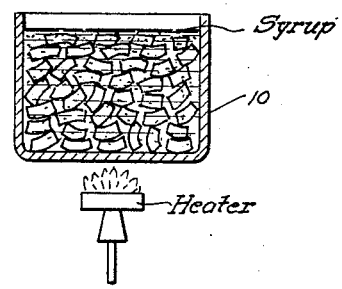
Figure 5:
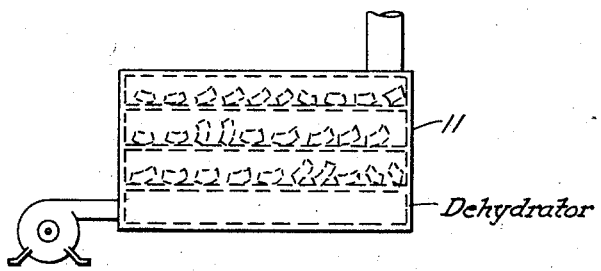
Figure 6:
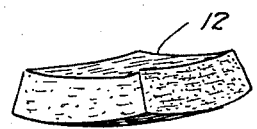

Fig. 1 indicates diagrammatically the packing of the rind to extract the natural juices; Fig. 2 illustrates the washing of the rind; Fig. 3 illustrates the cooking; Fig. 4 illustrates the replacement with syrup; Fig. 5 illustrates the dehydration; and Fig. 6 illustrates the final product.

The process will be described as applied to a watermelon, although citron melon and hybrid mixtures of watermelon and citron melon may be used. The watermelon is picked any time after the rind has matured and before it has reached the age at which the rind breaks down. The melon is first peeled, that is, the outer layer or skin of the rind is peeled off. Next the melon is cut into convenient sizes and the meat is cut from the rind. The rind is then packed in vessels, such as wooden kegs. A vessel 7 is filled with alternate layers of rind and dry salt, sodium chloride. The rind thus packed is allowed to stand in the keg for two to five days. The rind is then removed from the keg and placed in a tub 8, where it is thoroughly washed with fresh water and allowed to soak. The water is changed two or three times daily until most of the salt flavor has been removed. This requires from one to three days. In the keg 7, due to osmose, the juices of the rind cells will pass through the walls thereof and go into solution with the salt. The result is that the juices are removed and the rind toughened. In tub 8, the treatment to which the rind is subjected is merely for the purpose of removing the salt and in no way effects the physical structure. The rind is next cooked in a kettle 9 for the purpose of removing any salty flavor which may have been retained after the washing in cold water and also for the purpose of breaking up the structure slightly and rupturing a few of the cells. The water may be changed several times during the cooking process, if found desirable. The rind is now placed in a tub 10 containing syrup. The rind is completely immersed in the syrup and allowed to boil. The syrup used is preferably composed of sugar, glucose, and water. A suitable proportion of the parts consists of six parts of sugar, four parts of glucose and two parts of water by weight. The rind is now allowed to stand in the syrup for from three to ten days and the syrup is heated at least to the boiling point every twenty-four hours or oftener. This step results in the syrup being introduced into the cells, impregnating and filling the latter. The rind is now taken out and placed in a dehydrator 11 and treated therein until it is dried. The final product is indicated by 12 in Fig. 6. The product may be used in its dried form or dipped in proper syrup to coat it with crystallized sugar or glacé coating. The rind may also be flavored by placing suitable flavors in the syrup so that the final product has a distinctive flavor. The final product has very much the same appearance as candied citron and is used in the same manner.

What we claim is:

1. The process of treating melon rind which consists in extracting the natural juices from the cells by osmose, and introducing syrup into said cells.

2. The process of treating melon rind which consists in extracting the natural juices from the cells by osmose, rupturing the walls of a few cells and introducing syrup into said cells through the openings formed by the ruptures.

3. The process of treating melon rind which consists in packing the rind in a chemical dehydrant to extract the juices of the cells by osmose, and introducing syrup into said cells.

4. The process of treating melon rind which consists in packing the rind in a chemical dehydrant to extract the juices of the cells by osmose, rupturing the walls of a few cells, and introducing syrup into said cells through the openings formed by the ruptures.

5. The process of treating melon rind which consists in packing the rind in a deliquescent salt to extract the juices of the cells by osmose, rupturing the walls of a few of the cells, and soaking the rind in a syrup whereby the latter will enter the cells through the openings formed by the ruptures.

6. The process of treating melon rind which consists in packing the melon rind in a deliquescent salt to extract the juices of the cells by osmose, cooking the rind, and soaking the rind in a syrup to introduce the syrup into the cells through the openings formed by the ruptures.

7. The process of treating melon rind which consists in packing the melon rind in dry sodium chloride to extract the juices of the cells by osmose, washing the salt from said rind, cooking the rind in fresh water to rupture the walls of a few of the cells, and soaking the rind in syrup to introduce syrup into the cells.

In witness that we claim the foregoing we have hereunto subscribed our names this 24th day of December, 1923.

ROSS B. HALEY.
EDGAR G. ZINN.